United States Patent [19]

Russell et al.

[11] 3,769,462

[45] Oct. 30, 1973

[54] PRIVATE AUTOMATIC BRANCH EXCHANGE SERVICE CIRCUIT COMPLEX

[75] Inventors: Stanley L. Russell, Webster; Klaus Gueldenpfennig, Penfield; Uwe A. Pommerening, Webster, all of N.Y.

[73] Assignee: Stromberg-Carlson Corporation, Rochester, N.Y.

[22] Filed: Sept. 29, 1972

[21] Appl. No.: 293,750

[52] U.S. Cl. .............................................. 179/18 AD

[51] Int. Cl. .............................................. H04m 3/00

[58] Field of Search .................. 179/18 AD, 18 AH, 179/18 HA, 27 CA, 27 CD, 27 FF

[56] References Cited

UNITED STATES PATENTS

| | | | |
|---|---|---|---|
| 3,322,901 | 5/1967 | Trimmer | 179/27 CA |
| 3,327,064 | 6/1967 | Braund | 179/27 CA |
| 3,579,255 | 5/1971 | Kaiser | 179/18 AD |
| 3,629,511 | 12/1971 | Wolf | 179/18 AD |
| 3,697,700 | 10/1972 | Greason | 179/18 AD |
| 3,719,784 | 3/1973 | Adams | 179/27 CA |

*Primary Examiner*—Ralph D. Blakeslee
*Attorney*—Charles C. Krawczyk

[57] ABSTRACT

A service circuit complex used in a private automatic branch exchange for connecting any one of a plurality of various type trunks to various type service circuits, arranged in groups by type of service for servicing different type calls utilizes a common control arrangement for sequentially scanning the trunks for service requests and for applying signals to a trunk requesting service and the groups containing the type of service circuit requested for enabling the two to be interconnected through a switching network.

14 Claims, 10 Drawing Figures

FIG I

PATENTED OCT 30 1973 3,769,462

SHEET 04 OF 10

PRIVATE AUTOMATIC BRANCH EXCHANGE SERVICE CIRCUIT COMPLEX

BACKGROUND OF THE INVENTION

The invention relates in general to telephone systems, and more particularly to a service circuit complex under a common control arrangement for a telephone private automatic branch exchange.

In our copending application entitled, "Private Automatic Branch Exchange," Ser. No. 293518, filed jointly herewith and assigned to the same assignee of the present application, we have disclosed an electronic private automatic branch exchange having a capacity for automatically processing calls in connection with a large, substantially unlimited, number of subscriber stations. To obtain such an exchange, the equipment for providing the usual features of a private automatic branch exchange was combined with the switching equipment of a central office to provide a branch exchange of substantially unlimited size. The central office portion of the equipment was provided in the form of an electronic switching central office having a line link network for selectively connecting one of a plurality of subscriber stations via a junctor circuit and service link network to one of a plurality of local registers. A trunk link network was also provided for effecting termination of the calls from the junctor circuits back through the line link network to a terminating subscriber via a ringing control circuit or out through an incoming/outgoing trunk circuit to the outside world.

The private automatic branch exchange portion disclosed in our copending application included an operator service link network for providing access from the trunks to various service circuits. For instance, an operator console is accessed from an incoming/outgoing trunk, an attendant trunk or an access trunk via a position circuit associated with the console and one of a plurality of loop circuits associated with the position circuit. The operator service link network also effects the necessary connection of the incoming/outgoing trunks through an available dial pulse acceptor to an incoming register in the case of direct inward dialed calls and also provides connection to a plurality of transfer circuits which make possible an automatic transfer of parties with the exchange in response to an appropriate request by a party having the proper class of service.

The present invention relates to a common control arrangement for scanning the various trunk circuits to detect requests for service, monitoring the availability of the service circuits for accommodating a service request and marking each selected service circuit to effect its connection to the appropriate trunk through the operator service link network.

One characteristic feature of the present invention resides in provision of a plurality of operator loop circuits in association with each operator position circuit, which operator loop circuits may be selectively connected to and form a part of the operator position circuit either upon request from the operator for connection to any one of a plurality of access trunks through the operator service link network or in response to selection by the common control for connection through the operator service link network to any one of a plurality of an incoming/outgoing or attendant trunk circuit. An incoming/outgoing trunk provides an interface between the branch exchange and other exchanges while an attendant trunk permits a local part within the branch exchange to call an operator and an access trunk enables the operator to initiate a telephone connection between any two parties. In addition, each DPA and transfer circuit is connectable to any one of the incoming/outgoing trunk circuits. In other private branch exchanges of more conventional size, the operator circuits are generally provided with a direct connection to a dedicated trunk circuit; however, such an arrangement provides a serious limitation on the size of the exchange since the total number of trunks is limited to that number which can be properly accommodated by the number of operator positions. In a system having an extremely large number of subscriber stations, the speed of service available is seriously impaired where the number of trunks servicing the subscriber stations is limited.

Another important feature of the present invention resides in the provision of rotary circuits associated with each group of service circuits for preselecting an available service circuit so that upon request for a particular type of service circuit, an available one is immediately accessed. This materially increases the speed of response by avoiding the need to search for an available service circuit after the request is received.

Another characteristic feature of the present invention resides in the manner in which enabling time slots are applied to service circuit groups by the common control to enable marking to take place and which provides priority service for calls, such as direct inward dialed calls, which require connection from an incoming/outgoing trunk to a register through a dial pulse acceptor. Since it is desirable to handle calls from the outside world on a priority basis, the common control arrangement in accordance with the present invention provides for a priority enabling of dial pulse acceptors separate from the enabling of the position circuits and transfer circuits and a priority in the handling of requests for a DPA circuit as opposed to requests for a transfer or position circuit. In accordance with the present invention, all requests for a DPA circuit will override requests for the operator or for transfer so that all register requests will be serviced prior to other requests regardless of the order of receipt of such requests. Thus, both the rapid enabling of and the priority servicing of requests for dial pulse acceptors provides for a greatly increased speed in the servicing of calls received in the exchange from the outside world.

Another characteristic feature of the present invention resides in the use of buses from the trunks to the common control for carrying the signals which request connection of the trunks to the service circuits. Because of the particular enabling system provided by the common control arrangement, the use of signal buses from the trunks to the common control is possible, thereby materially reducing the complexity of the exchange, which additionally reduces its cost and increases its reliability.

It is therefore an object of the present invention to provide a new and improved common control service circuit complex for use in a private automatic branch exchange which is capable of accommodating a substantially unlimited number of subscriber stations.

It is another object of the present invention to provide a new and improved service circuit complex under a common control arrangement for a private automatic branch exchange which is capable of high speed operation through priority enabling and preselection of equipment.

It is a further object of the present invention to provide a new and improved service circuit complex for a private automatic branch exchange which is made less complex in construction due to the use of busing for carrying signals to the common control, thereby providing for economy of manufacture and reliability in use.

It is still another object of the present invention to provide a new and improved common control service circuit complex for a private automatic branch exchange which makes possible the provision of a plurality of subscriber services in connection with an exchange of substantially unlimited size.

These and other objects, features, and advantages of the present invention will become more apparent from the following detailed description thereof, when taken in conjunction with the accompanying drawings, which illustrate one exemplary embodiment of the present invention.

DETAILED DESCRIPTION OF THE INVENTION

Figure 1:
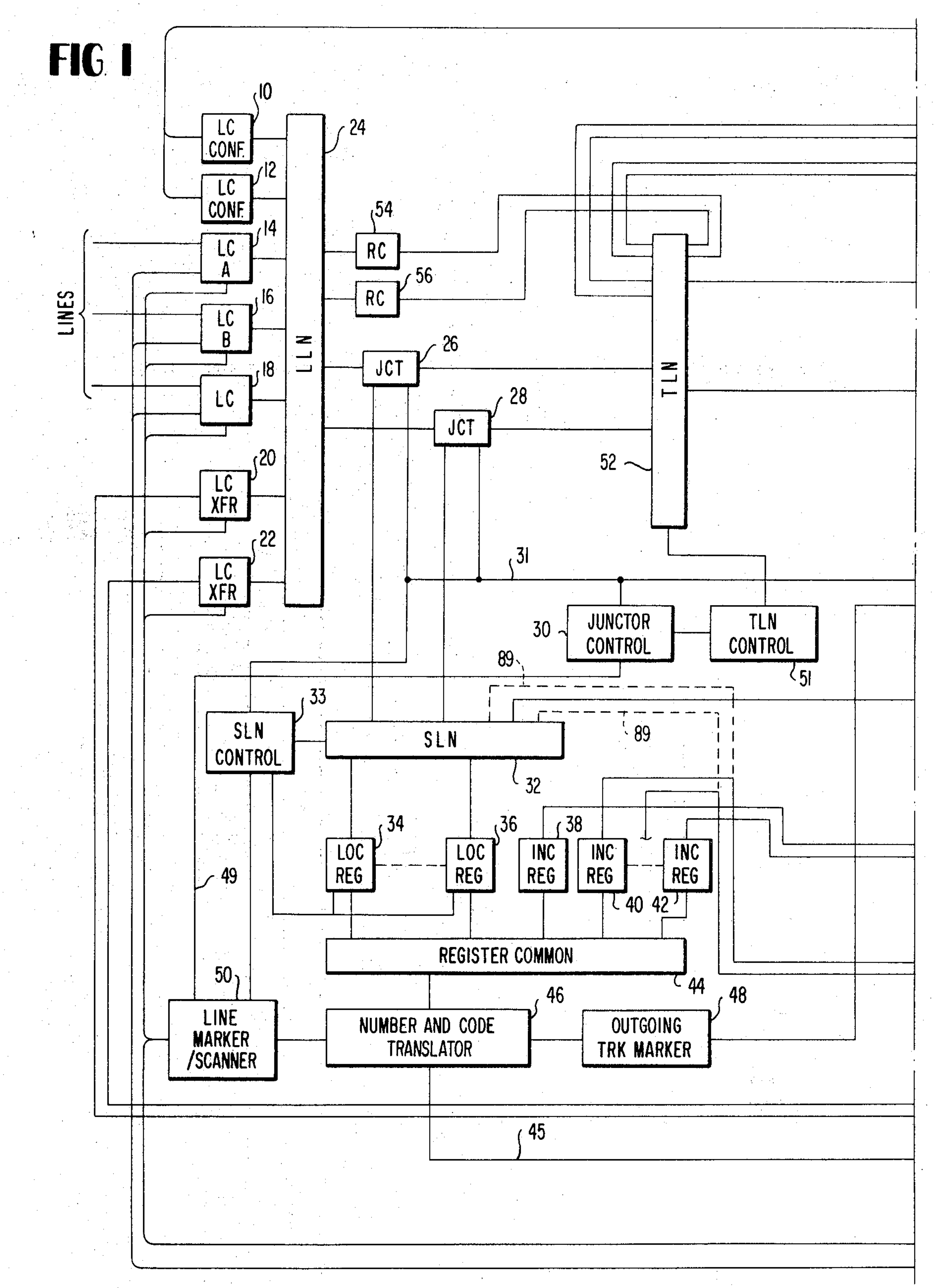
FIGS. 1–3 when combined in numerical order provide a schematic block diagram of the private automatic branch exchange in which the present invention may be utilized.
Figure 2:
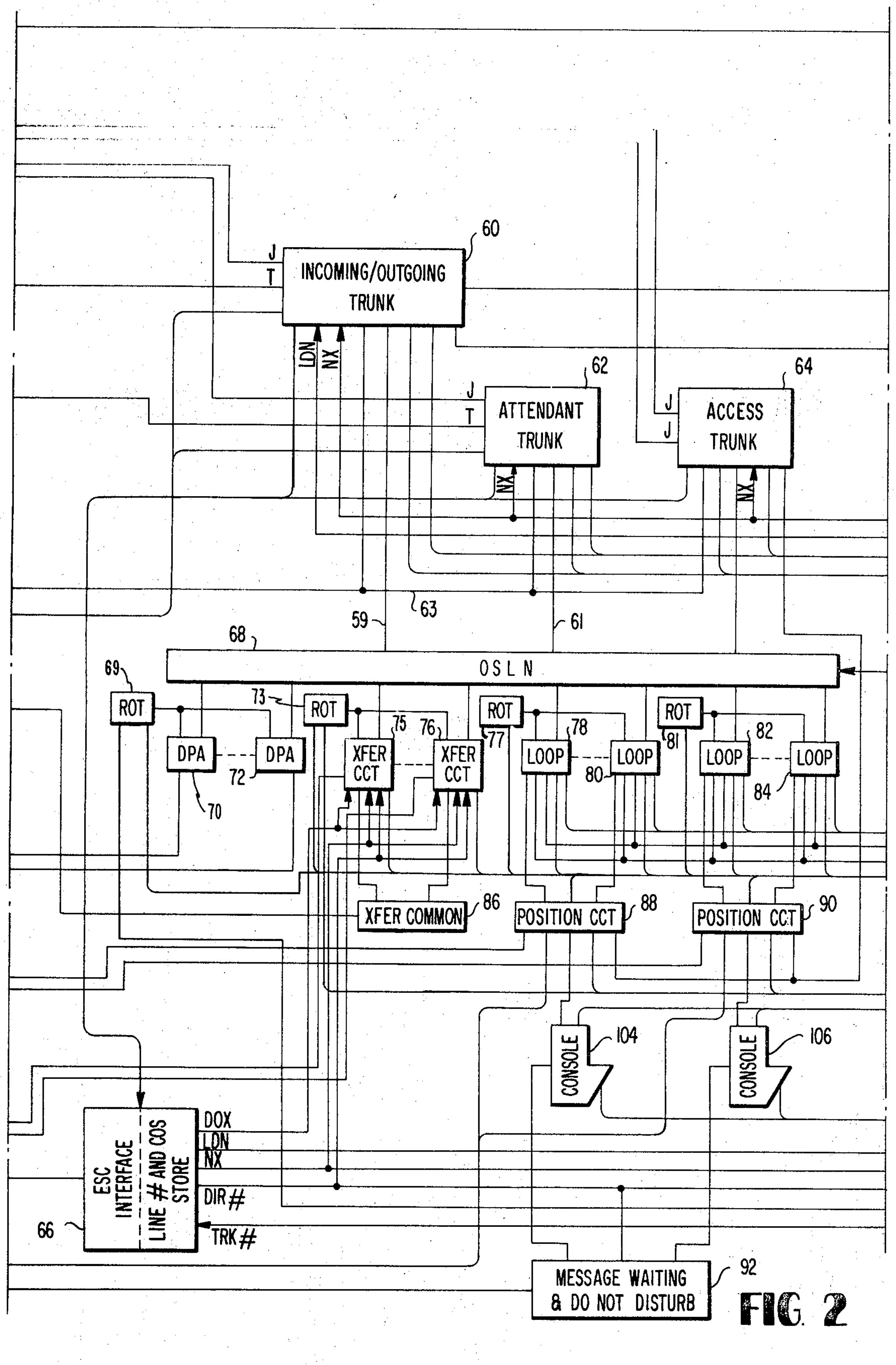
Figure 3:
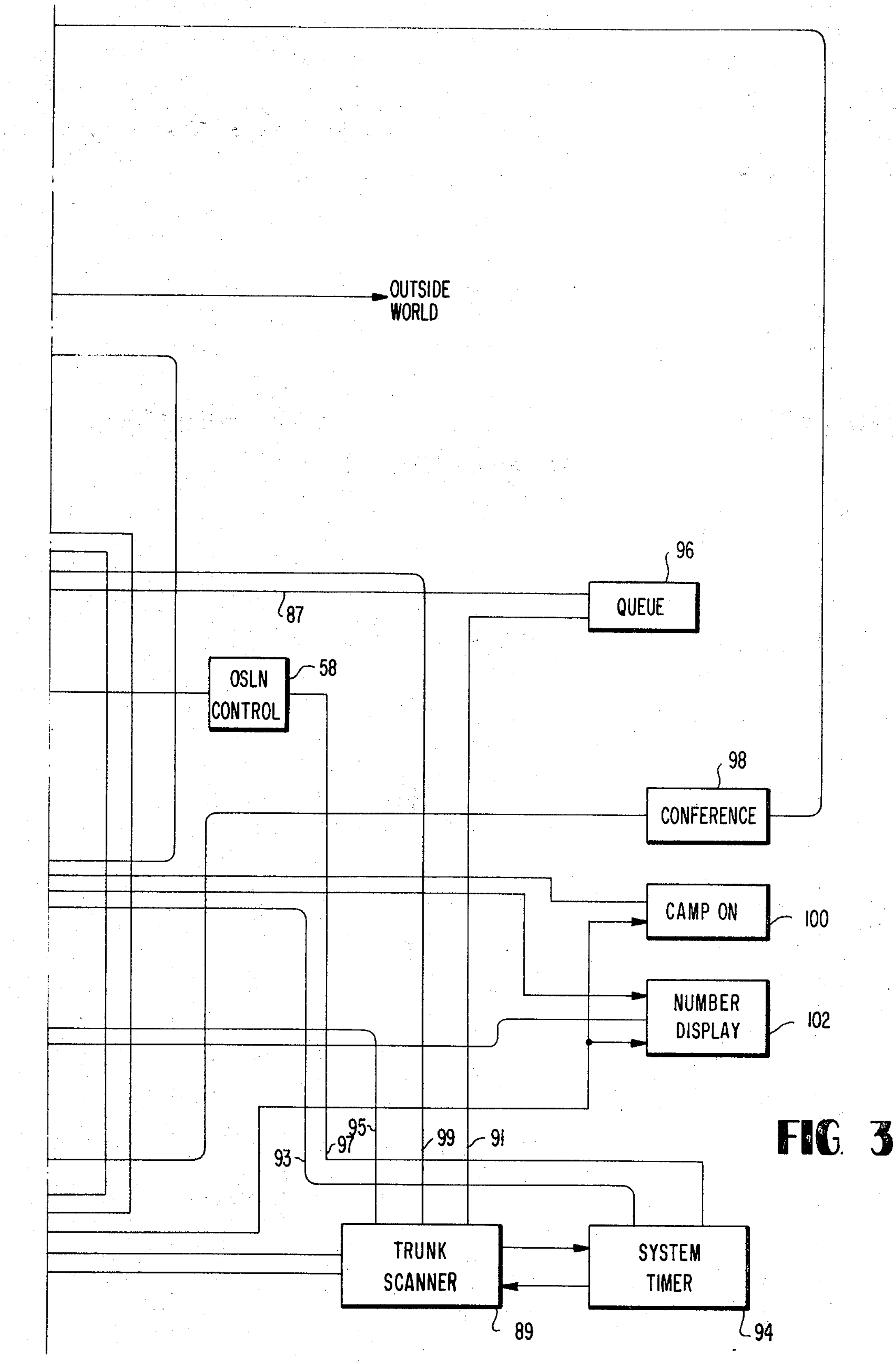

It will be seen from the drawings that FIG. 1 represents that portion of the system which relates to an electronic switching central; while, FIG. 2 and 3 provide equipment which forms part of a private branch exchange. Thus, the most basic feature of the present invention, which provides for the combination of an electronic switching central with a private branch exchange, can be easily recognized from FIGS. 1–3.

Looking first to the portion of the system illustrated in FIG. 1, which provides the electronic switching center (ESC) equipment, there is included a line link network (LLN) 24 which functions as a concentrator for originating line calls and a fan out for terminating calls. The LLN consists of two stages of matrices, for example, and is used for both originating and terminating types of traffic. One end of the LLN 24 is connected to a plurality of line circuits such as the conference line circuits 10 and 12, typical subscriber line circuits 14, 16, 18 and transfer line circuits 20 and 22. The number of subscriber line circuits provided vary in number in dependence upon the telephone service to be offered, but may typically exceed four thousand lines. The typical subscriber line circuits 14, 16 and 18 are more fully described in copending U.S. application Ser. No. 153,233, filed on June 15, 1971, for Otto Altenburger, which is assigned to the same assignee as the present invention.

The line link network 24 provides one unique path between circuits connected to opposite ends of the network. Each of the switching networks in FIG. 1 includes matrix switches comprised of relays including a mark or control winding for initially actuating the relay and a hold or sleeve coil connected in series with its own contacts for maintaining the relay in the actuated state after a path through the network has been established. The last stage of the line link network 24 provides a termination for both originating traffic from the line circuits and incoming traffic to the line circuits. The terminating paths through the line link network to a line circuit are unique paths so that no path finding need be performed between the ringing controls 54 and 56 and a line circuit through the line link network.

The terminations for the originating paths through the line link network are connected to one of a plurality of junctors, such as junctors 26 and 28. The number of junctors and ringing controls provided depends upon the traffic requirements for the system. The ringing controls are more fully described in U.S. Pat. No. 3,671,678, issued on June 20, 1972, in the name of Otto Altenburger, which is assigned to the same assignee as the present invention. The junctor circuits 26 and 28 and the junctor control circuit 30 is more fully described in copending U.S. application Ser. No. 100,571, filed on Dec. 22, 1970, in the name of Otto Altenburger, which application is assigned to the same assignee of the present invention.

The junctors 26 and 28 serve as the focal points for all local originating type traffic. The junctors include provisions for connecting the line circuits to the local registers 34 and 36 via a service link network (SLN) 32, and for providing transmission battery for calling and called parties on intraoffice calls. The junctors are under the control of the calling party. When trunk or station busy conditions are encountered, the junctors provide the busy tone to the calling party.

The service link network 32 includes two stages of matrices (P and S) and is controlled by a SLN control circuit 33 for connecting the calling line circuit via one of the junctors to one of a plurality of local registers. The local registers, when connected to the junctors, provide dial tone and include apparatus for acting on the subscriber instructions. The junctors terminate on the P stage and the dial pulse acceptors (not shown) in the local registers terminate at the S stage of the service link network. The local registers include dial pulse acceptors which provide the dial tone to the calling subscriber, detect rotary dial pulses and extend the pulses to storage sections in the local registers.

The local registers also comprise a register storage and register output and a sender for providing outpulsing. The registers and senders are controlled by a register common 44 which contains the necessary control units. The local registers are connected to the register common 44 on a time division multiplex basis wherein information is passed from one equipment to another on a common bus basis. The register common 44 is also connected to communicate with a number and code translator 46 on a time division multiplex basis. The translation circuit provides information such as equipment number, ringing codes and class of service. The number and code translator 46 is connected to the line scanner-marker circuit 50 which has the means to detect service requests and means to access the individual line circuits.

The ringing controls 54 and 56 connect ringing generators to terminating or called stations, detect off hook conditions (ring-trip) of the called station, and provide ring-back tone for the calling station. Each line circuit can be connected to any of a plurality of ringing controls which are accessed from a trunk link network (TLN) 52 so that a ringing control is automatically connected to the terminating line circuit as soon as a connection to that line is complete.

A line scanner and marker circuit 50 continuously checks the line circuits for an off hook condition, and is used for both originating and terminating types of traffic. In the event of originating traffic, the line scanner stops when an off hook condition is detected and transmits the information from its counter circuits to a marker circuit to mark the particular line circuit and enables the SLN control 33 to initiate a path finding operation between an available local register and the line circuit requesting service. In the event of terminating traffic, the line scanner is controlled by the number and code translator 46 so as to receive an equipment number from the translator to mark the line circuit with the particular equipment location. Furthermore, in terminating traffic, the line marker is also involved in transmitting the terminating subscriber classes of service, ringing code, busy or idle status, and types of ringing required through the junctor control 84 to the ringing control 34. The line scanner-marker circuit 50 is more fully described in copending U.S. application Ser. No. 101,091, filed on Dec. 23, 1970, in the names of Gunter Neumeier and Otto Altenburger, which is assigned to the same assignee as the present invention.

The trunk link network (TLN) 52 provides for the termination of the local traffic to local subscribers, the termination of incoming calls from other exchanges to the local subscribers, and for the connection of incoming calls from other exchanges to other external exchanges. The TLN 52 includes a three stage network. When further expansion is necessary, another stage can also be included. A D stage of the matrix is the entrance to the TLN and is connected to the local junctors 26 and 28. An F stage is the output or exit of the TLN and is connected via the ringing controls to the line link network 24 and also to the trunk circuits.

Path finding through the trunk network 52 is performed under the control of the TLN control 51 and the junctor control 30. The TLN control 51 and the junctor control 30 work together in completing the termination portion of a call, whether it is an internally terminated call, or an outgoing call to a distant office. The number and code translator 46 and line scanner-marker 50 are used to complete calls to local lines, and the number-code translator, together with the outgoing trunk marker 48 complete calls to the trunks. The outgoing trunk marker 48 is fully described in a copending U.S. Pat. application entitled, "Outgoing Trunk Marker" Ser. No. 103,267, filed on Dec. 31, 1970 for Otto Altenburger and David Stoddard and assigned to the same assignee as the present patent application.

The path finding scheme of the TLN control 51 includes a two-step scan. The junctor has been previously marked, and furthermore, the information in the local registers is transmitted via the register common 44 to the number-code translator 46 at this time. In the event of a call terminating to a local subscriber, the number-code translator via the line scanner-marker circuit marks the line circuit of the terminating call. In the event of an outgoing call, the number-code translator via the outgoing trunk marker circuit marks the particular trunk circuit.

The path finding sequences through the SLN and the TLN along with the equipment associated therewith are more fully described in copending U.S. application Ser. No. 153,221, filed on June 15, 1971, in the name of Otto Altenburger and Robert Bansemir, which application is assigned to the same assignee of the present invention.

Looking now to the portion of the system illustrated in FIGS. 2 and 3, which includes the private branch exchange (PBX) portion, five types of trunk circuits may be provided in the telephone system of the present invention; however, only an incoming/outgoing trunk 60 providing direct inward and direct outward dialing, an attendant trunk 62, and access trunk 64 are illustrated. The access trunks 64 are used solely by the operators to orginate calls to the subscriber stations; while, the attendant trunks 62 are used by the local stations for access to the operator, from which they can be extended to another trunk or local station. The incoming/outgoing trunks 60 interface the telephone exchange with distant offices. Each of the incoming/outgoing trunks 60 and attendant trunks 62 have port appearances at both the originating and terminating ends of the trunk link network 52, while the access trunks 64 have two line port appearances only on the originating ends of the trunk link network. The outgoing trunk marker 48 is connected to each of the incoming/outgoing trunks 60 and attendant trunk 62 and serves to select a trunk circuit for a call originated by one of the local subscribers in response to the dialed digits as analyzed by the number and code translator 46. The incoming/outgoing trunk 60 is fully described in our copending U.S. Pat. application entitled, "Trunk Circuit", Ser. No. 293571 filed jointly herewith and which is assigned to the assignee of the present patent application.

An operator service link network (OSLN) 68 controlled by an OSLN control 58 is provided for connecting the trunks 60, 62, and 64 to various service circuits such as the dial pulse acceptors 72–74, transfer circuits 75–76 and loop circuits 78–84. The operation of the OSLN 68 and the OSLN control 58 and the method of signalling through the OSLN is fully described in two copending U.S. Pat. applications entitled, "Path Finding System," Ser. No. 92,593, filed on No. 25, 1970 for Klaus Gueldenpfennig and Stanley L. Russell and "Telephone Switching Network Signalling System," Ser. No. 92,588, filed on Nov. 25, 1970, for Klaus Gueldenpfennig, Stanley L. Russell and Uwe A. Pommerening, both of which patent applications are assigned to the assignee of the present patent application. The loop circuits 78–84 are separated into two groups 78–80 and 82–84, the former being connected to an operator console 104 via a position circuit 88 and the latter being connected to another operator console 106 via a position circuit 90. The loop circuit groups 78–80 and 82–84 are associated with rotaries 77 and 81, respectively, which serve to preselect an available loop for connection to the associated position circuit in preparation for a request for connection from a trunk to the operator console via its associated position circuit through the OSLN 68. The position circuits 88 and 90 are connected to the system timer 94 and trunk scanner 89 forming the common control for the PBX portion of the system, and the position circuits 88 and 90 also are directly connected to dedicated incoming registers, such as 40 and 42 respectively, associated with the register common 44 and number and code translator 46 in the ESC portion of the system. If it is desired to avoid dedicating registers to any single piece of equipment as in the foregoing manner, then alternatively the position circuits 88 and 90 can be connected to the local registers such as 34 and 36 through the SLN 32 as indicated in FIG. 1 by the dashed lines. The operation of the position and loop circuits is fully disclosed in our copending application entitled, "Operator Loop Complex," Ser. No. 293572, filed jointly herewith and assigned to the assignee of the present application.

The incoming/outgoing trunk circuit 60 may also be connected through the OSLN to one of several dial pulses acceptors 72–74, which although shown separately for convenience are part of the dedicated incoming registers 38 and 40, respectively. The dial pulse acceptors 72–74 are also preselected by a rotary 69 for connection through the OSLN 68 to a trunk upon request for service and are accessed by the trunk scanner 89 via the rotary 69.

The incoming/outgoing trunk 60 may also be connected through the OSLN 68 to one of several transfer circuits such as 75–76 which are connected respectively to dedicated transfer line circuits 20–22 at the input of the line link network 24. The transfer circuits are also preselected by a rotary 73 in preparation for a request for connection through the OSLN 68 to a universal trunk 60. The transfer operation includes the use of a transfer common 86 which is connected to the transfer circuits 75 and 76 and has a dedicated input to the service link network 32 for obtaining access to a local register 34–36. The transfer circuits 75 and 76 are also connected to the system timer 94 and trunk scanner 89 via the rotary 73. The operation of the transfer circuit and transfer common is fully described in our copending application entitled, "Transfer Circuit," Ser. No. 293681, filed jointly herewith and assigned to the assignee of the present application.

A queue 96 is provided in association with the incoming/outgoing trunks 60 and attendant trunks 62 to provide for servicing of requests for the operator on a first come-first served basis. The operation of the queue 96 is fully described in our copending U.S. Pat. application entitled, "Queue For Electronic Telephone Exchange," Ser. No. 108,380, filed on Jan. 21, 1971, and is assigned to the assignee of the present application. The queue 96 is connected between each of the incoming/outgoing and attendant trunks and the trunk scanner 89 and serves to forward to the trunk scanner 89 the request for operator signals as they appear at the output of the queue in conjunction with the scanning of the particular trunk by the trunk scanner 89. The trunk scanner 89 scans each of the incoming/outgoing trunks 60, attendant trunks 62, and access trunks 64 in sequential order and is stopped in its scanning on a particular trunk upon receiving a request for service signal in connection with that trunk. The request for service signal may relate to a request for a loop circuit to serve an operator, a request for a transfer circuit, or the request for a DPA in connection with a direct inward dialed call. A requested service circuit is available when the request is received in the trunk scanner 89, a stop scan signal will be generated and the request for service signal will be forwarded to that service circuit.

The system timer 94 applies enabling time slots to each of the service circuit groups such as the position circuits 88 and 90 and the transfer circuit rotary 73 is sequential order simultaneously with the more rapid sequential enabling of the dial pulse acceptors 72 and 74. A service circuit is enabled for connection to a trunk only during the enabling time slot assigned to its group. For instance, a loop circuit can be connected to a trunk only when its associated position circuit is enabled by the system timer 94. When a stop scan signal has been generated in the trunk scanner 89 and a request for service signal has been forwarded to all the groups containing the type of service circuit requested, the service circuit preselected by that rotary which is first enabled by the system timer 94 (or first position circuit to be enabled by the timer 94 in the case of a loop circuit) will be seized and connection through the OSLN 68 from the trunk to the selected circuit will be effected.

The system in accordance with the present invention also provides for various special features circuits including a message waiting and do not disturb system 92, a conference system 98, and a camp or system 100. The camp on system is disclosed in our U.S. Pat. Nos. 3,676,606 and 3,679,835 both being assigned to the same assignee as the present invention.

As is quite well known, an electronic switching central of the type described in connection with FIG. 1 services requests from subscriber stations and connections from the outside world to subscribers within the system by common control equipment which functions on the basis of detected conditions; accordingly, in such a system, once a connection has been established from or to a subscriber station through the system, the common control equipment releases to leave only the communication connection. However, the PBX portion of the system and its various special features circuits require certain information in connection with a communication connection, such as the calling and called line circuit directory numbers, the class of service of the various parties involved and the numbers of the trunks which may be involved in the call. This type of information is not retained by the ESC portion of the system once the connection through that portion of the system is established and so the present invention provides a PBX-ESC interface and line number store 66 which receives information concerning the subscriber line circuits and the class of service of these circuits at the time the connection through the ESC is effected so that this information may be received and stored in the PBX portion of the system for further use in connection with the special service features. For example, each time a trunk is marked for connection to a subscriber station, the data concerning the subscriber station including the directory number and class of service thereof will be forwarded via line 45 to the ESC interface and line number store 66 for storage therein or for transfer into the trunk circuit itself. For example, the transfer class of service will be forwarded to the trunk circuit upon connection thereof to the subcriber station by enabling of the NX data bus from the store 66 each time a connection to a trunk is effected. Signalling concerning dialed information from the number and code translator 46 and the PBX portion of the system is also effected through the ESC interface 66, such as signalling in connection with the dialing from the outside world of the listed directory number of the system by enabling the LDN lead or dialing by an inside subscriber of 0 on a transfer operation by enabling the DOX lead.

Figure 4:
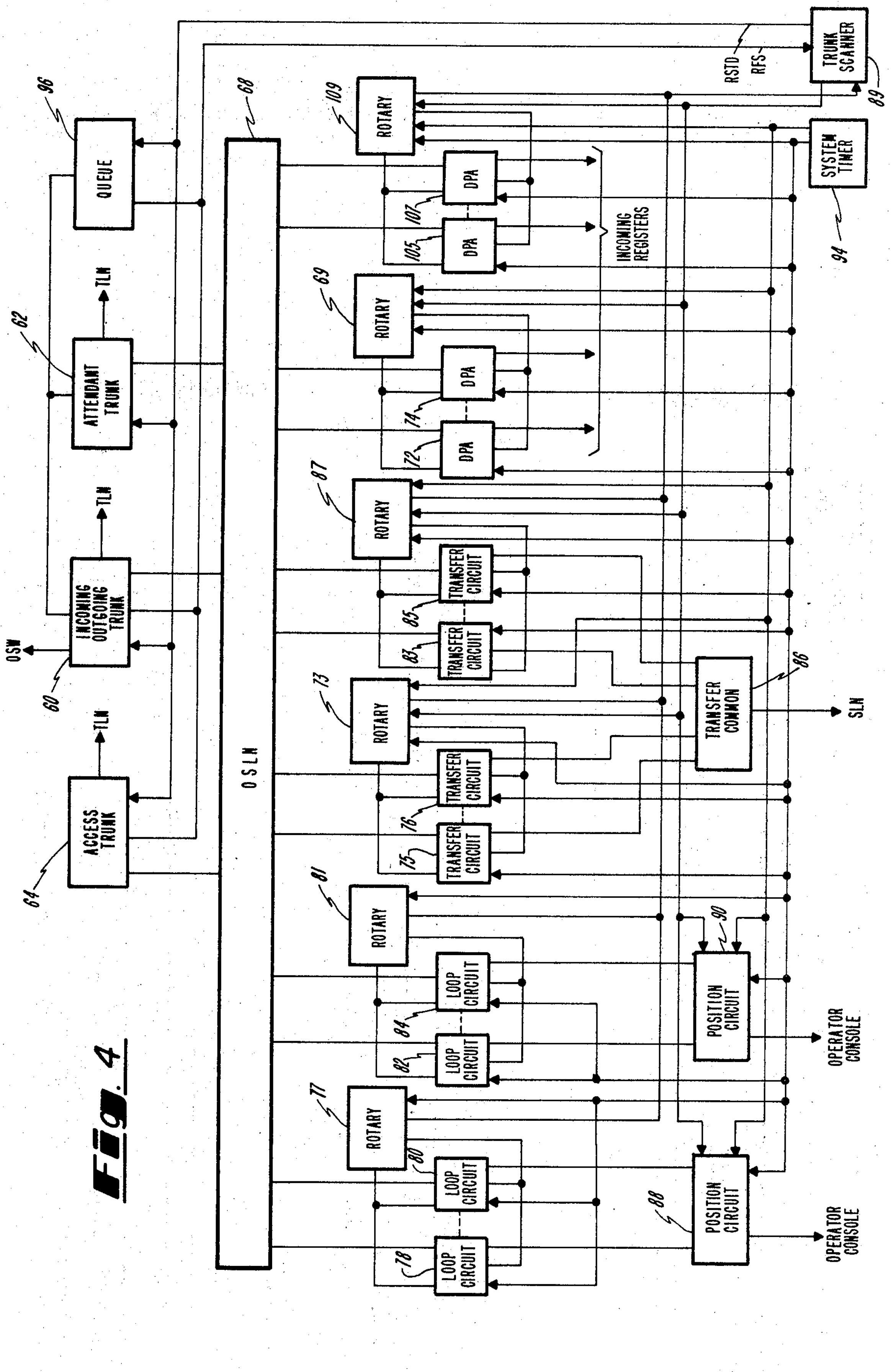
FIG. 4 is a simplified schematic block diagram of the service circuit complex in accordance with the present invention.

FIG. 4 illustrates a simplified block diagram of the common control service circuit complex of the present invention, which includes the two operator position circuits shown in FIG. 3, namely 88 and 90, together with their assocaited loops 78–80 and 82–84 respectively, the former being serviced by the rotary 77 and the latter by the rotary 81. Connected to the transfer common 86 are two groups of transfer circuits 75–76 and 83–85, the former being serviced by the rotary 73 and the latter by a rotary 87. The first group of dial pulse acceptors 72–74 is serviced by the rotary 69 while a second group 105–107 is serviced by a rotary 109. It should be pointed out that the system can employ as many service circuit groups and as many service circuits within each group as necessary to meet traffic requirements.

The service circuits are connected to one side of the OSLN 68. To the other side of the OSLN 68 is connected the incoming/outgoing trunk 60, attendant trunk 62, and access trunk 64. It should be noted that the system may employ as many trunks as necessary to meet traffic requirements. The queue 96 is connected to the incoming/outgoing trunk 60 and attendant trunk 62 to receive trunk requests for an operator at the time the trunk is scanned by the trunk scanner 89. The queue 96 is also connected to the trunk scanner 89 so that it may comprise the number of the trunks being scanned with the number of the trunk in the queue 96 not slated for servicing. When the numbers are the same, the queue 96 then applies a request signal to the trunk scanner 89 enabling it to send out a signal to service the request. The trunk scanner 89 provides a service circuit request signal to all the service circuits of the type requested, for instance the operator position circuits 88 and 90 for an operator request, the transfer circuit rotaries 73 and 87 for a transfer request and the DPA rotaries 69 and 109 for a register request. The system timer 94 provides timing signals to the trunk scanner 89 and enabling time slot signals to the aforementioned service circuit groups so that the first group to be enabled having an available requested service circuit will be the one in which a service circuit is connected to the requesting trunk. The service circuit meeting the request will have already been preselected by the group rotary.

In response to appropriate conditions, an incoming-/outgoing trunk can generate four different signals requesting service, an RRFS steady state signal requesting a register, an RRSR time-slotted signal requesting a register, a QRFS time-slotted signal requesting an operator, via the queue 96 (or a GRFS signal if the queue 96 is not used), and an XRFS time-slotted signal requesting a transfer circuit. An attendant trunk will generate only a QRFS time-slotted signal requesting an operator via the queue 96 (or a GRFS signal if the queue 96 is not used) since this type of trunk is designed specifically to provide connection between one of the subscriber stations and an operator position. An access trunk is an operator trunk which is accessed only by the operator, and this type of trunk generates two request signals, a GRFS time-slotted signal simultaneously with an XRFS time-slotted signal in response to a signal from the operator position circuit.

The various trunks are internally set up to generate these request for service signals in response to detected conditions, such as seizure from the outside world in connection with an incoming/outgoing trunk, seizure from a subscriber station in connection with an attendant trunk, seizure from an operator position circuit in connection with an access trunk, request for an operator from an incoming/outgoing trunk upon seizure from the outside world, or request for a transfer circuit detected in the incoming/outgoing trunk. All of the request for service signals, with the exception of the QRFS signal, are transmitted directly to the trunk scanner 89 via a common bus RSF. Thus, all of the RRFS signals from all of the incoming/outgoing trunks will be applied on one line to the trunk scanner 89, all of the XRFS signals from all of the incoming/outgoing trunks will be applied on a second line to the trunk scanner 89, and so forth. The QRFS signals generated in the incoming/outgoing and attendant trunks will all be applied on a single line to the queue 96, which will then apply a GRFS signal to the trunk scanner 89 via the common bus RSF when the next trunk slated for servicing by the queue 96 is scanned.

The trunk scanner 89 sequentially scans each of the trunks in the system at high speed by extending a signal RTSD thereto, which provides the timing for generation in the trunks of the time-slotted signals RRSR, QRFS, and XRFS. As will be indicated in greater detail hereinafter, the steady register request RRFS is generated immediately within the trunk upon seizure from the outside world without waiting for the trunk to be scanned.

The trunk scanner 89 also serves to generate the service request signals which are forwarded to the service circuits upon receipt of the request signals from the trunks and the queue 96, provided a request service circuit is available. For this purpose, each of the rotaries in the service circuit group is continuously monitored by the trunk scanner 89 to determine at all times whether a service circuit is available for connection to a trunk upon request.

Figure 5:
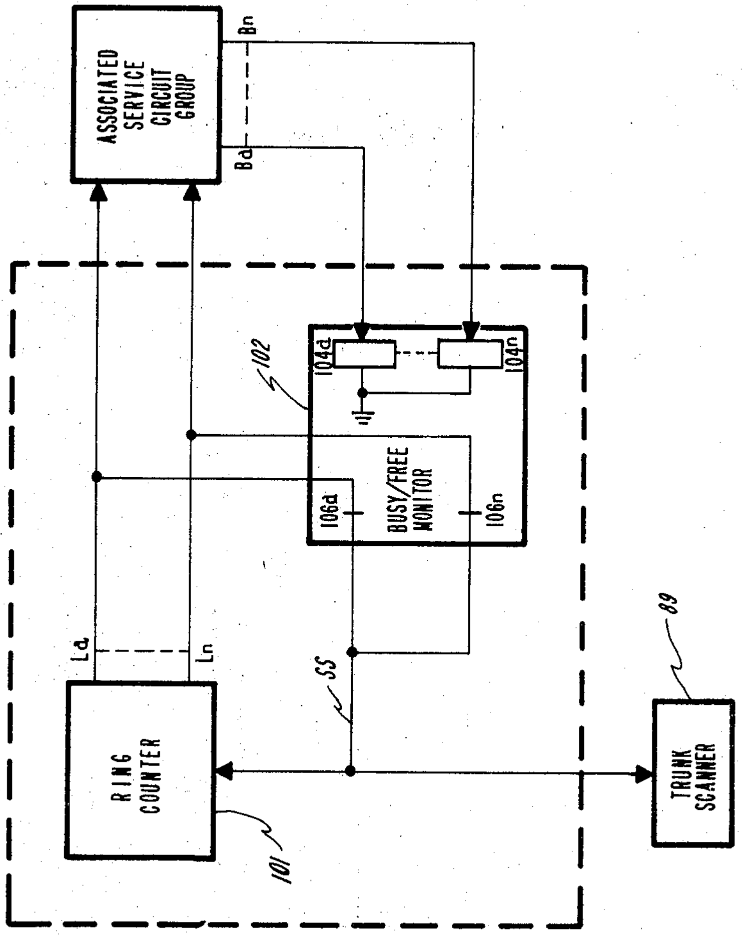
FIG. 5 is a detailed block diagram of the rotary circuit.

The operation of the rotary which is the same for all service circuit groups may be best understood by referring to FIG. 5. The rotary comprises a ring counter 101 which when running sequentially applies a signal to the leads L*a*–L*n*, continuously repeating the same. N corresponds to the number of service circuits in the group which must be serviced by the rotary. The leads L*a*–L*n* are connected to a busy-free monitor 102 which for purposes of illustration only is shown to contain a plurality of relays **104*a*–104*n*, each relay controlling a different one of the contacts 106*a*–106*n*,** each contact being located in series with a different one of the leads L*a*–L*n*. When all of the relays **104*a* –104*n* are operated all the contacts 106*a*–106*n*** are open so that the signal applied by the ring counter sequentially to leads L*a*–L*n* cannot be fed back to it. via lead SS. This maintains the ring counter in a running condition. When one of the relays 104 is deenergized, its associated contact 106 is closed so that when the ring counter 101 applies the signal to the associated lead it can feed back thereby causing the ring counter to stop running. Although the leads $La$–$Ln$ are also connected to the associated service circuits in the group being serviced during the running condition, the signal applied by the ring counter 101 has no effect thereon because of the speed with which the signal is sequentially applied. Once the ring counter 101 stops, however, the signal applied to the lead at which the ring counter 101 stops is continuously applied to the corresponding service circuit thereby enabling it to meet the next service request from the trunk scanner 89.

The busy-free condition of the service circuit group being serviced is monitored by applying signals from the individual service circuits within the group to the busy-free monitor 102 via leads $Ba$–$Bn$. These leads are in direct correspondence to the leads $La$–$Ln$ so that leads $La$ and $Ba$ are connected to the first service circuit, leads $Lb$ and $Bb$ are connected to the second service circuit, etc. When a service circuit is busy and unavailable it applies an energizing potential to its associated $Ba$ lead so that its associated relay 104 in the busy-free monitor 102 is operated. Consequently the associated 106 contact will be open and the ring counter will be unable to stop at the associated L lead to preselect that particular service circuit for the next service request since the signal cannot be fed back on the lead. When a service circuit is free and therefore available it applies a ground to its associated B lead to maintain its associated relay 104 deenergized and its associated 106 contact closed. Consequently when the first available service circuit within the group has a signal applied to its associated lead L its associated relay 104 will be deenergized thereby permitting the signal to be passed through the associated normally closed contact 106 back to the ring counter 101 stopping its operation. This signal is also passed on to the trunk scanner 89 indicating that a service circuit within the group is available. When all the service circuits in the group are busy all the contacts 106 are open and no signal can be applied to the trunk scanner 89 which indicates that the rotary is running and that a request by a service circuit within that particular group cannot be met.

So long as a service circuit within the group is available and no request is received from the trunk scanner 89 for that type service circuit the rotary remains stopped. As soon as a request is received and processed by that particular type of service circuit within the group, the service circuit applies an energizing potential to its associated B lead thereby operating its associated relay 104 in the busy-free monitor 102. The opening of the normally closed contact 106 blocks the signal which was holding the ring counter 101 stopped thereby permitting it to resume running in order to find another free service circuit to meet the next service circuit request. This saves a considerable amount of time in the servicing of requests by eliminating from the very beginning any attempt to seek out a service circuit when not one of the circuits of the type requested is available.

Although a particular type service circuit request from a trunk is passed on via the trunk scanner 89 to all the service circuit groups of that type only one service circuit can respond to the request. That service circuit will be located in the first group which has an available circuit of which is first enabled by the system timer 94 after the trunk scanner generates the service request. Within the enabled group only the preselected service circuit can respond to the request since the enabling signal from the rotary is gated with the request. Although all the service circuits within the group receive the request only the preselected circuit receives the enabling signal. At that time the preselected service circuit is enabled to send out a mark signal to the OSLN 68 which is used in the path finding scheme to effectuate a connection to the trunk. To assure adequate time for finding a path and marking the connectors within the enabling time slot, service requests from the truck scanner 89 are permitted to be passed onto service circuit groups only at the beginning of a time slot and not after the time slot has started. This will be explained in detail later with regard to the operation of the trunk scanner 89.

Figure 7:
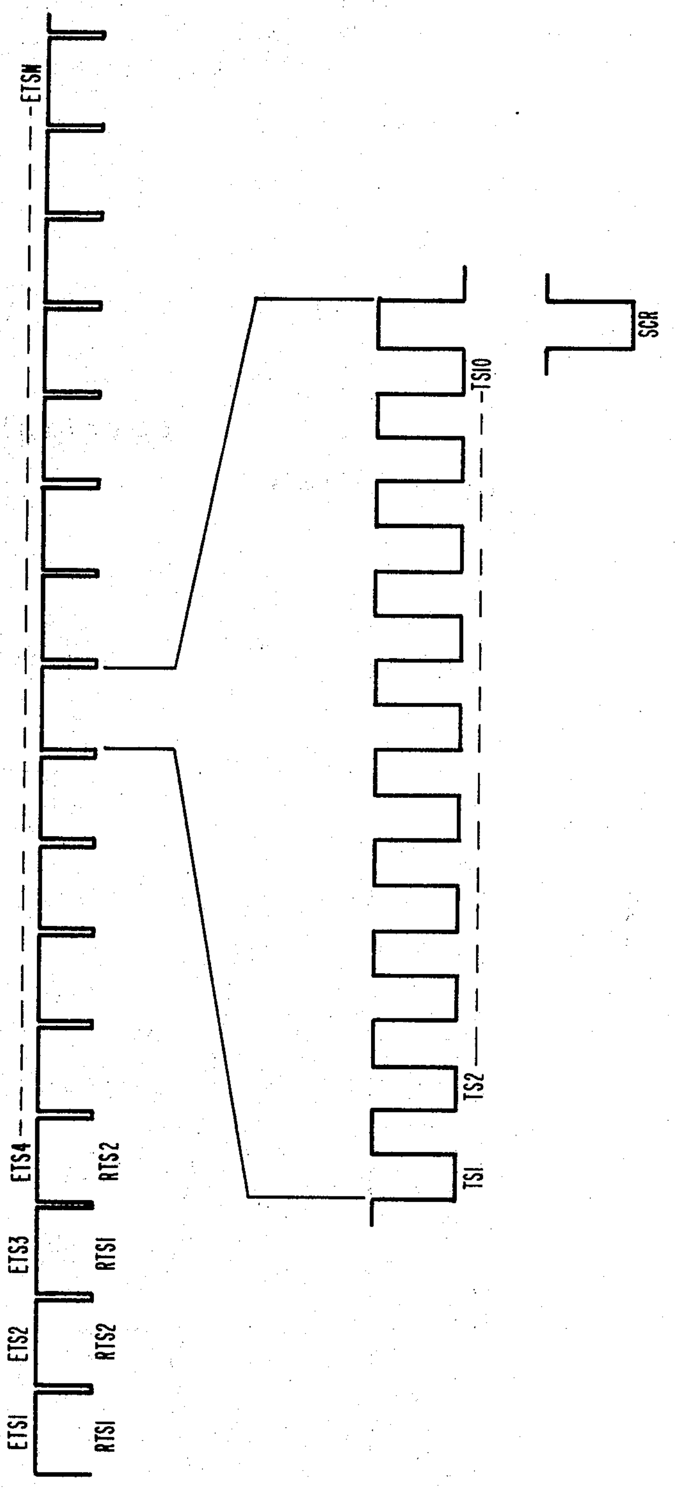
FIG. 7 is a waveform diagram illustrating the relationship between the various time slots generated by the system timer.

The sequential enabling of the service circuit group is accomplished independently of the trunk scanning by the system timer 94 which runs at a much slower speed than the trunk scanner 89. As seen in FIG. 7, the system timer generates as many sequential enabling time slots ETS 1 – ETS N, as necessary to cover all the service circuit groups. Each enabling time slot, for example, may be of 10 millisecond duration. Each of the position and transfer circuit groups, is assigned one of the time slots in sequence so that a service circuit within a group can be marked for enabling connection to a trunk and when the group it is in is enabled by the assigned time slot from the system timer 94. The DPAs are enabled independently of the other service circuits so as to provide a priority of service in connection with all requests for a register. For this purpose, the system timer 94 generates as many register time slot signals as DPA groups, there being two in the embodiment shown, each being of the same duration as the enabling time slots and being applied sequentially as shown in FIG. 7, at the same time that the enabling time slots are generated. Thus, although complete enabling sequence for the operator position circuits and transfer circuits requires N enabling time slots a complete enabling sequence of the DPAs require only two time slots. By enabling the DPAs independently of the other circuits, the speed of processing requests for a register is greatly increased as compared to the arrangement wherein the DPAs are enabled in sequence along with the other service circuits.

Figure 6:
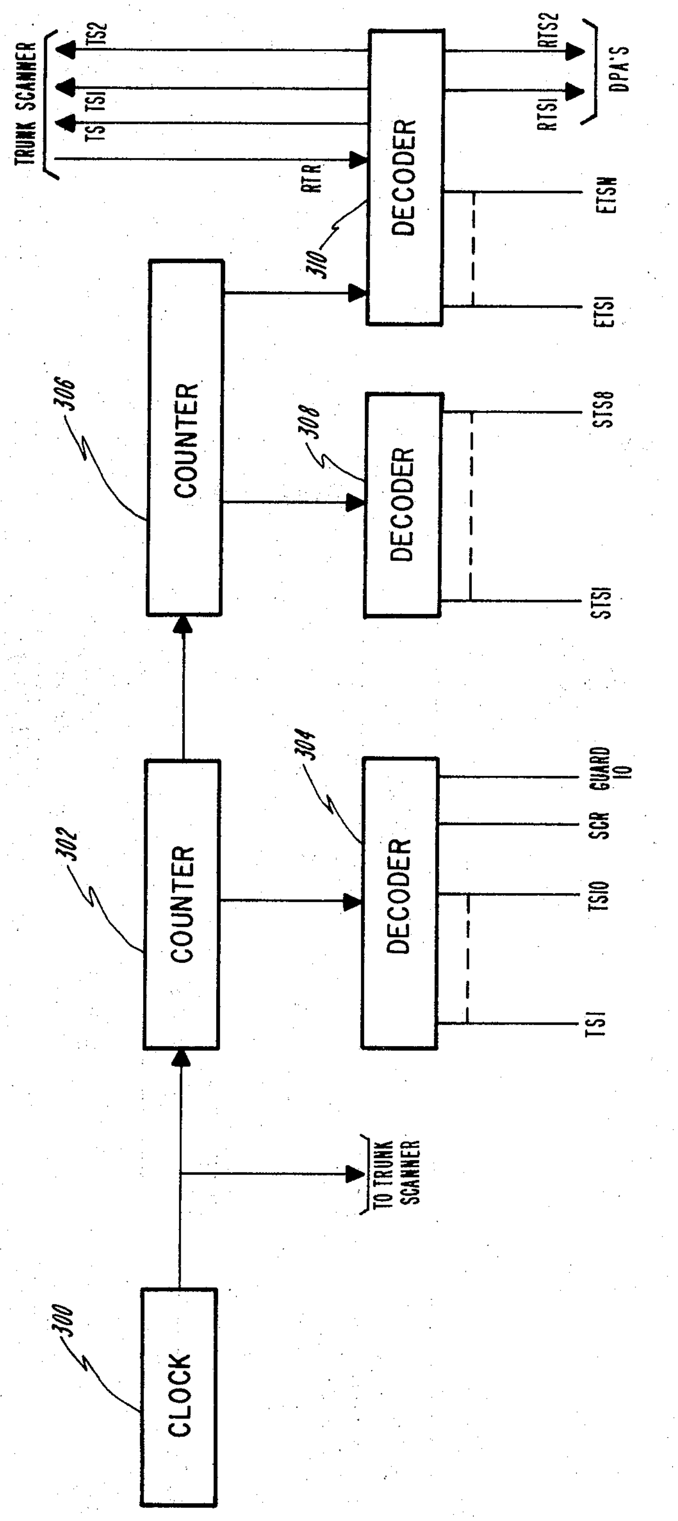
FIG. 6 is a detailed block diagram of the system timer in common control.

The system timer 94 is illustrated in greater detail in FIG. 6. A clock 300 applies its output to a first counter 302 which is connected to a decoder 304 providing time slot signals TS1–TS10. As illustrated in FIG. 7, simultaneous with each of the enabling time slots ETS 1 –ETS N is generated ten time slots TS1–TS10, which are applied to all of the service circuits and associated equipment simultaneously for signalling purposes and for timing various operations during and after a connection to a trunk is established. The reset portion of time slot TS10 is utilized to generate a scan recess signal SCR which is also derived from the decoder 304. The signal Guard 10 also generated from the decoder 304 substantially corresponds to TS10.

The output of counter 302 is applied to a second counter 306 which is associated with a pair of decoders 308 and 310. The decoder 308 generates a plurality of signals STS1 –STS 8, which form sleeve time slot signals and which supplement the time slots TS1–TS10 by signalling through the operator service link network on the sleeve lead to control various functions after a connection has been established through the OSLN from a trunk to a service circuit. The decoder 310 generates the time slot signals ETS 1 –ETS N, which as described earlier are extended to the transfer circuit group via the transfer rotaries 73 and 87 at the loop circuit group via the position circuits 88 and 90. The decoder 310 also generates the register time slot signal RTS 1 and RTS 2 which are extended to the DPA circuit group via the rotaries 69 and 109.

The trunk scanner 89 as well as all of the other circuits in the system with the exception of the transfer common 86 are operated in response to the timing signals TS1–TS10 provided from the system timer 94. Thus, the output of the clock 300 is extended to the trunk scanner to control the timing of the scanning of the various trunks in the system. In addition, a signal TS which represents the leading edge of each service circuit time slot is extended to the trunk scanner 89 to indicate each of the times when a leading edge of the time slots is generated. Enabling time slots TS1 and TS2 are also extended to the trunk scanner for control purposes.

As also indicated previously, the enabling of the DPAs is performed on a priority basis independently of the enabling of the other service circuit groups. In addition, the present invention provides for the inhibiting of the enabling of all circuits except DPAs when a register request has been received in the trunk scanner from one of the incoming/outgoing trunks. A signal RTR indicating a register request is received from the trunk scanner 89 in the decoder 310 and is AND-gated with the enabling time slots so that they will be inhibited when RTR is recieved from the trunk scanner 89. Under these conditions, the decoder 310 will continue generating the RTS 1 and RTS 2 signals thereby enabling the DPA via the rotaries 69 and 109. As will be described in more detail hereinafter, the service circuit group which receives the enabling time slot signals cannot be enabled unless they receive the proper request for service signal from the trunk scanner; which is inhibited by the RTR1 signal in the trunk scanner; however, to avoid any possibility of erroneous enabling of the improper circuit at the time a register is requested, the enabling time slots may also be inhibited by the RTR signal.

Figure 8:
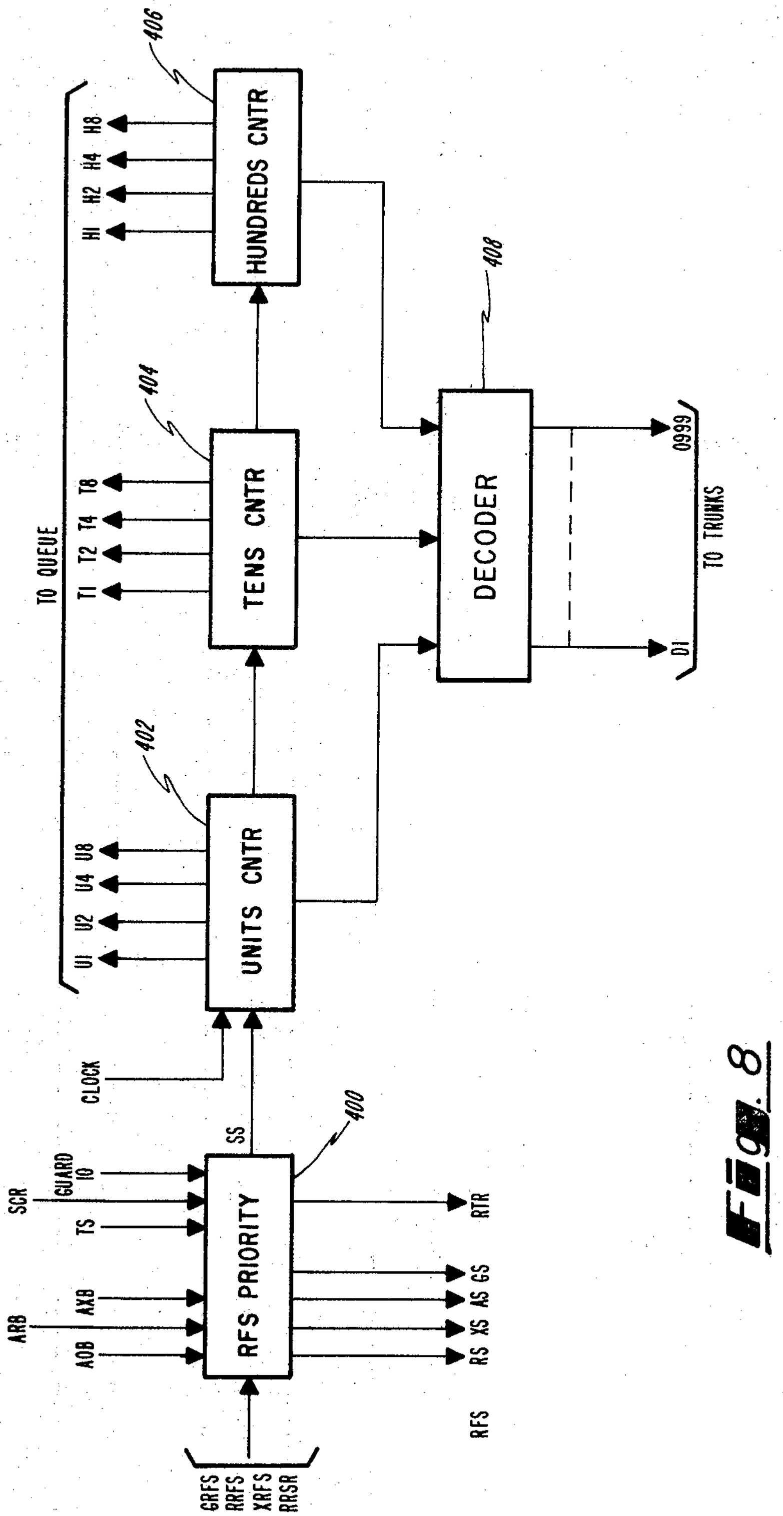
FIG. 8 is a detailed block diagram of the trunk scanner in the common control.

The basic configuration of the trunk scanner 89 as illustrated in FIG. 8 includes a units counter 402, tens counter 404, and hundreds counter 406 connected in tandem to a clock input derived from the system timer 94. The counters 402, 404, and 406 are connected to a decoder 408 which provides the individual outputs TR1 –TR999 for scanning each of the trunks in the system. Outputs U1–U8 from the units counter 402, T1–T8 from the tens counter 404, and H1–H8 from the hundreds counter 406 also designate the trunk being scanned in binary coded decimal form, which outputs are extended to the queue 96 where this trunk number is compared to the trunk number at the output of the queue to determine whether the trunk being scanned is the next trunk in line for service.

The trunk scanner also includes a request for service (RFS) priority circuit 400 which is connected to the RFS bus extending to the trunks and the queue 96. The signals GRFS, RRFS, XRFX and RRFR are connected by the RFS bus to the priority circuit 400 and are received along with the signals indicating the availability of the service circuits. The signal AOB (all operators busy) is received from the output of an AND gate (not shown) having inputs connected to each of the rotaries associated with the operator position circuits. When all of the rotaries are running, it indicates that no loop circuit is available for preselection causing an AOB signal to be generated and be applied to the priority circuit 400. Similarly, if all of the DPAs are busy, a signal ARB will be generated indicating that all registers are busy, and when the transfer circuits are all busy a signal AB will be generated and applied to the priority circuit 400 indicating that all transfer circuits are busy. If a requested service circuit is not available when the request is received in the priority circuit 400 the scanner 89 merely continues to run since the request cannot be met.

The priority circuit 400 generates the request for service signals which serve to mark the service circuits for connection to the trunks requesting service. These signals include the register request signal RFSRS, the transfer request signal RFSXS, the access trunk request signal RFSAS, and the operator request signal RFSGS. The priority circuit 400 also generates the register request signal RTR which extends to the system timer 94 and receives from the system timer the timing signals TS, Guard 10 and SCR.

The trunk scanner 89 continuously scans all of the trunks in the system from the outputs of the decoder 408 until a request for service signal is received in the priority circuit 400 coincident with an indication from the rotaries that a circuit of the type requested is available. At that time a stop scan signal SS is generated which inhibits the further application of clock pulses to the counter chain including the units counter 402, tens counter 404, and hundreds counter 406. The trunk scanner 89 then stops on the particular trunk scanned at that time and remains on that trunk until the request for service signal from the trunk disappears.

Figure 9:
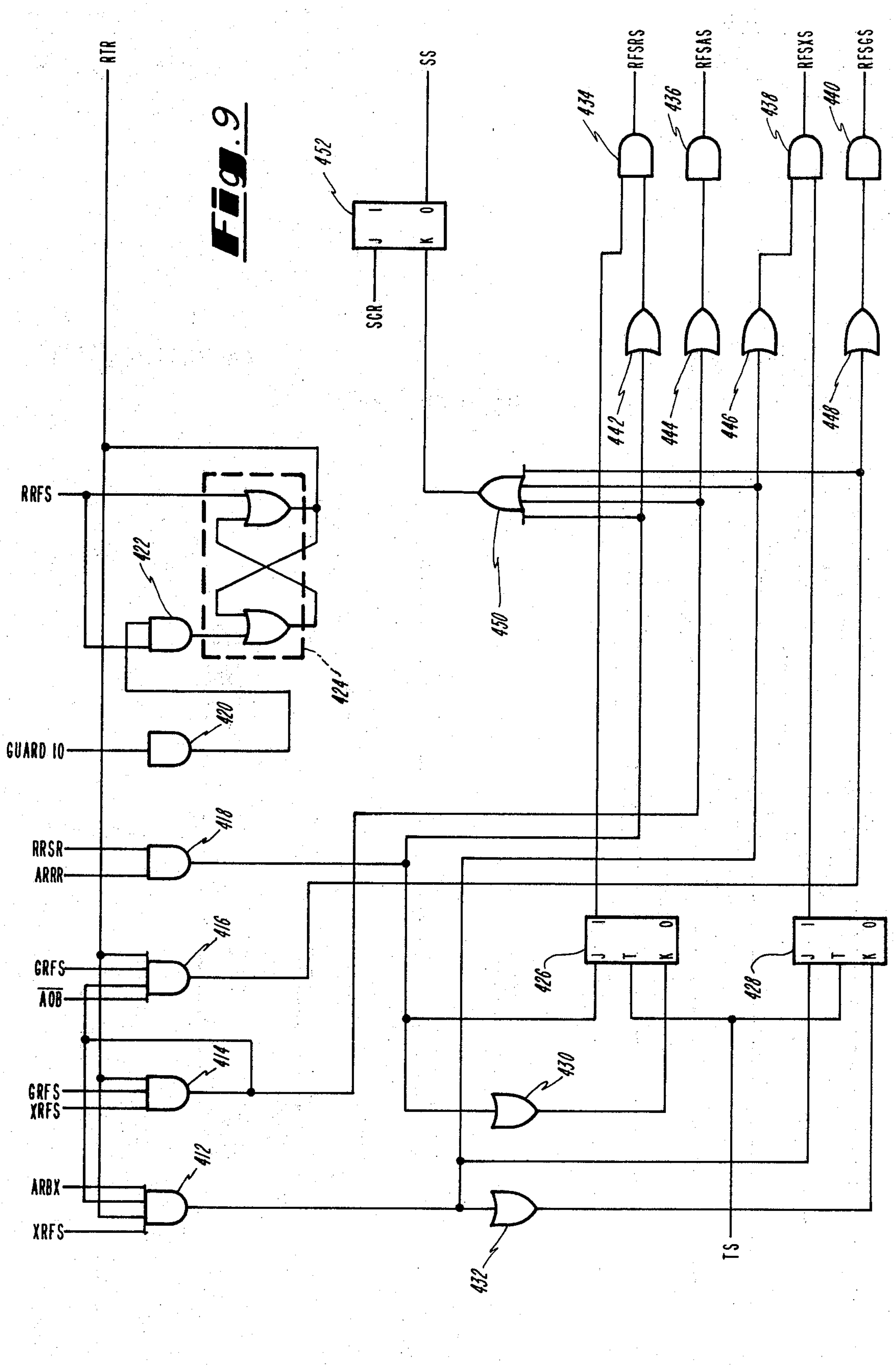
FIG. 9 is a schematic circuit diagram of the priority circuit which forms part of the trunk scanner.
Figure 10:
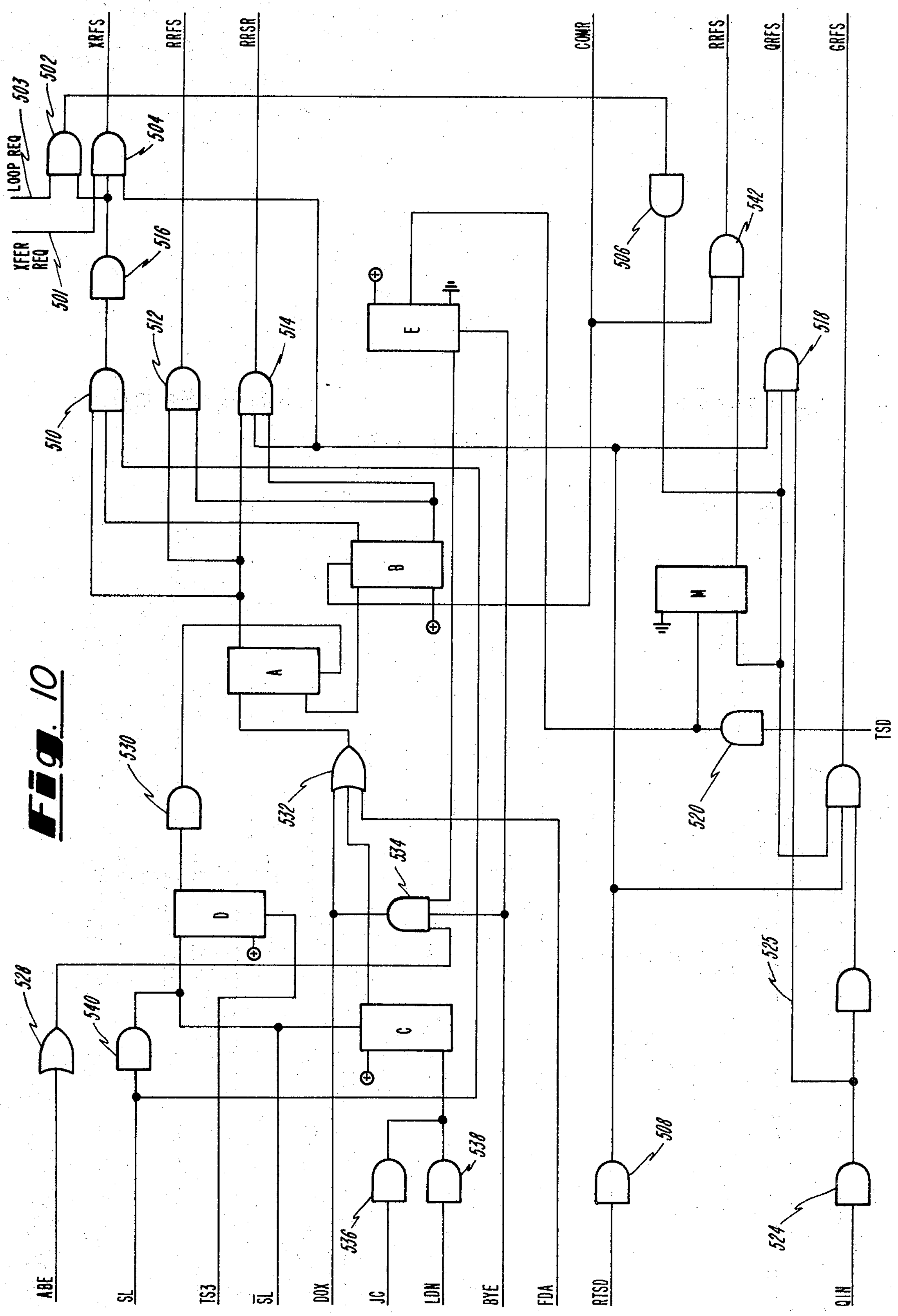
FIG. 10 is a schematic circuit diagram of the portion of an incoming/outgoing trunk circuit providing the logic circuitry for requesting connection of the trunk circuit to the service circuit complex.

The details of the RFS priority circuit 400 are illustrated in FIG. 9. A general request for service to the operator received in the form of a GRFS signal on the RFS bus in conjunction with a signal $\overline{AOB}$ indicating that all operators are not busy is detected by NAND gate 416 whose output is an RFSGS signal which is extended to each of the operator position circuits simultaneously.

Upon receipt of a GRFS signal and an XRFS signal on the RFS bus indicating a request for an access trunk, the NAND gate 414 is enabled producing an RFSAS signal output which extends simultaneously to all operator position circuits. It will be noted that the output NAND gate 414 is also simultaneously applied to the inputs of gates 416 and 412 to inhibit these gates, which are also responsive individually to the GRFS and XRFS signals, respectively. Thus, while a GRFS and XRFS signal is received on the bus from one of the trunks, the gates 416 and 412 will not be enabled as a result of being inhibited by the output of gate 414, which recognizes the simultaneous receipt of both of these signals as a request for an access trunk.

When an XRFS signal is received on the RFS bus from one of the trunks at a time when a signal $\overline{AB}$ is also received indicating that all transfer circuits are not busy, this condition is detected by NAND gate 412 whose output is then extended to the J input of the flip-flop 428 through the inverter 432. Upon receipt of the signal TS from the system timer 94 representing the leading edge of an enabling time slot, the flip-flop 428 is set so as to provide an output to NAND gate 438.

This NAND gate 438 also receives the output of NAND gate 412 through an inverter 446 and thereby provides the output RFSXS to each of the transfer circuits. The flip-flop 428 is utilized in conjunction with the signal TS from the system timer 94 to ensure that a transfer circuit will not be accessed in the middle of an enabling time slot to ensure adequate time for marking. The generation of the RFSXS and RFSRS signals are synchronized to the beginning of the enabling time slots by the trunk scanner circuitry while the RFSGS and RFSAS signals enabling operator connections are so synchronized by circuitry within the position circuit before being passed on to the loop circuits after being received from the trunk scanner 89. This is necessary because of the complexity of the position and loop circuits.

The requests for register are handled in a slightly different manner than the other requests from the trunks. At the time an incoming/outgoing trunk is seized from the outside world, the trunk immediately generates an RRFS signal without waiting to be scanned from the trunk scanner 89, and the RRFS signal is immediately transmitted to the trunk scanner where it is applied directly to one input of a flip-flop 424 and through a NAND gate 442 to the other input of the flip-flop 424. The NAND gate 442 is not enabled until receipt of the Guard 10 timing signal from the system timer via the inverter 420, at which time the flip-flop 424 is set, generating the signal RTR. As already indicated, the Guard 10 signal corresponds to TS10 and this signal serves to prevent the RRFS signal from setting the flip-flop 424 until the enabling time slot period presently being generated is concluded. The signal RTR which is forwarded to the system timer 94 then inhibits the generation of enabling time slots, permitting the enabling of the dial pulse acceptors alone. The RTR signal is also applied to the inputs of NAND gates 412, 414 and 416 to inhibit the generation of request signals in the trunk scanner 89 for an operator or transfer circuit until the register request is fulfilled.

As will be noted from FIG. 8, the receipt of the RRFS signal does not affect the operation of the trunk scanner, which continues to scan each of the trunks in the system. When the trunk generating the RRFS signal is scanned by the trunk scanner, the trunk will then generate an RRSR time slotted signal which extends on the RFS bus to the trunk scanner 89 and is received at one input of the NAND gate 418. If at that time a signal $\overline{\text{ARB}}$, indicating that all DPAs are not busy, it is also received at the other input of NAND gate 418, the gate will be enabled thereby enabling the setting of the flip-flop 426 via an inverter 430 upon receipt of the TS signal from the system timer 94. The output of flip-flop 426 is applied to one input of a NAND gate 434 while the output of gate 418 is applied through an inverter 442 to the other input of NAND gate 434, whose output RFSRS is then extended to each of the DPAs.

If any of the NAND gates 412, 414, 416 or 418 are enabled, the output thereof will set the flip-flop 452, thereby generating the stop scan signal on lead SS. The flip-flops are all reset by the scan reset signal SCR at the end of each enabling time slot.

FIG. 9 is a schematic circuit diagram of the portion of an incoming/outgoing trunk circuit which provides for generation of the different request for service signals forwarded to the queue 96 and trunk scanner 89 and which is fully disclosed in a copending application entitled, "Trunk Circuit," Ser. No. 293571 filed jointly herewith and assigned to same assignee as the present application. This circuit is typical of the circuitry provided in each of the incoming/outgoing, attendant and access trunks in principal operation; although, it will be appreciated from the foregoing description that the access trunks are designed solely for connecting the operator to one of the subscriber stations or trunks within the system and so, for example, such trunks will not provide for generation of register requests. A pair of flip-flops A and B are controlled within the trunk so that the logic states thereof determine which of the request for service signals will be generated from the trunk.

Initially, in the idle condition both the A and B flip-flops are reset indicating no request. When the incoming/outgoing trunk is seized from the outside world, a seizure signal ABE is applied through an inverter 528 to one input of a NAND gate 534. Seizure of the trunk will also cause generation of a busy and enable signal BYE which is applied to another input of the NAND gate 534 and also enables the busy flip-flop E, which is set upon receipt of the drive signal TSD via gate 520. The set flip-flop E provides the third input to the NAND gate 534, the output of which is then applied through a NOR gate 532 to set flip-flop A. With flip-flop A set and flip-flop B reset, the trunk is internally prepared to immediately generate a resgister request signal RRFS. The set output from flip-flop A and reset output from flip-flop B are applied to respective inputs of a NAND gate 512 which immediately forwards the RRFS signal to the trunk scanner 89 to indicate a priority and inhibit the generator requests for other than a register. When the trunk is then scanned by the trunk scanner 89, the scanning signal RTSD is applied through an inverter 508 to one input of a NAND gate 514, which also receives on its other two inputs the set output of flip-flop A and reset output of flip-flop B. The enabled NAND gate 514 then forwards the time slotted register request signal RRSR to the trunk scanner 89, to stop the trunk scanner in its selected position.

The trunk scanner 89 marks the trunk which has generated the RRSR signal and also generates an RFSRS to initiate the connection operation. It should be noted that more than one trunk may generate an RRFS signal requesting a register and that regardless of the order in which the trunks are seized by the outside world, the first trunk to be scanned from the trunk scanner will receive service first. However, all trunks requesting connection to a register will be serviced prior to those trunks which request other connections since the generation of enabling time slots by the system timer 94 will be inhibited so long as an RRFS signal is received on the service request bus from any trunk. Since a complete sequential enabling of the DPA group is so much faster than the complete sequential enabling of the other service circuit group, the servicing of the trunks requesting a register in the order scanned is perfectly satisfactory, so that there is no need for queuing the request for register. However, if it is desired to queue such requests, this may be accomplished in the same manner as provided for requests for operator.

Once the trunk is connected through the OSLN to an available dial pulse acceptor DPA, the flip-flops A and B will be switched to an advanced counter condition with A reset and B set for servicing later requests for an operator or transfer. This is accomplished onnce the path through the OSLN is completed and ground is received on the sleeve lead SL. An inverter 540 will then provide an output to set flip-flop D on time slot TS3 from the system timer 94 and the set output of flip-flop D will be applied through an inverter 530 to reset flip-flop A. The resetting of flip-flop A will cause the set input of flip-flop B to go high thereby setting this flip-flop. With flip-flop A reset and flip-flop B set, the trunk is ready to service a request for the operator or for a transfer circuit.

When the outside world dials the listed directory number of the system, the call is to be extended to the operator; however, until the dialed digits can be analyzed by the number and code translator 46, the system cannot determine whether the call is a direct inward dialed call or a listed directory number call. Accordingly, when the outside world seizes the incoming/outgoing trunk, the trunk will be connected through the operator service link network 68 and an available dial pulse acceptor 70 of an available incoming register 38, in the manner already described. When the dialed digits have been received by the incoming register 38 and analyzed by the number and code translator 46, the translator will signal the PBX-ESC interface via line 45 to enable the LDN bus indicating that a listed directory number has been dialed.

The enabling of the LDN lead to the trunks will be detected by an inverter 538. The fact that the junctor port of the trunk is not occupied is also detected by an inverter 536. These conditions enable the setting of flip-flop C and flip-flop A. As soon as ground is removed from the sleeve lead through the OSLN to the DPA this flip-flop condition will actuate the system. The sleeve mark is removed by the automatic release of the dial pulse acceptor, with flip-flops A and B now set and with no ground on the sleeve lead SL, a NAND gate 510 will be enabled causing the output of gate 518 which is connected to one input of NAND gate 504 to go high (T5). The leads 501 and 503 extend from a class of service flip-flop (not shown) which will be set at the time of connection to a subscriber station having a transfer class of service available, in which case the lead 501 will go high and the lead 503 will go to ground. However, until a connection has been extended to a subscriber station or is extended to a subscriber station not having a transfer class of service available, the flip-flop will remain reset placing a high on lead 503 and ground on lead 501. In the case where a listed directory number has been dialed from the outside world, no connection has as yet been made to a subscriber station and so the class of service flip-flop will place a high on lead 503 and ground lead 501. Thus, the high at the output of inverter 516 will be extended to one input of gate 502 while the high will be extended from the class of service flip-flop on lead 503 to the other input of NAND gate 502. As a result, NAND gate 502 will be enabled placing a high via inverter 506 at respective inputs of gates 518 and 522. If a queue is provided in the system as described above, ground will be permanently provided on the QIN lead to gate 524 which will place a high via line 525 on one of the other inputs to NAND gate 518. When the trunk is scanned from the trunk scanner, the signal RTSD will be applied via gate 508 to the remaining input of NAND gate 518, which will then extend the QRFS signal to the queue. At the same time, the trunk will forward its trunk number to the queue 96 for storage therein.

The receipt of the QRFS signal in the queue 96 will initiate a comparison between the trunk number received from the trunk scanner and the next trunk number at the output of the queue to determine whether the trunk presently being scanned is the next trunk to which service is to be provided. If no other trunk numbers had been stored previously in the queue, a comparison will be detected and the queue will immediately forward a GRFS signal to the trunk scanner 89 to produce a stop scan, if at least one operator is available for connection to the trunk. If other trunk numbers had previously been stored in the queue, no comparison will be detected and the trunk scanner will be allowed to continue its scanning of the trunks servicing those trunks whose numbers are stored in the queue in the order of storage. If the system does not provide a queue, the lead QIN will be high at the input of gate 524 thereby providing a high at the output of gate 526 to one of the other inputs to gate 522. Thus, when the trunk is scanned, the input RTSD will be applied through gate 508 to the last input of gate 522, which will then extend a signal GRFS to the trunk scanner 89 initiating a stop scan if at least one operator is available for connection to the trunk.

The operator may also be accessed from a subscriber station having a no transfer class of service, which station has been connected to the outside world as a result of a direct inward dialed call by the subscriber flashing his hookswitch. The hookswitch flash is detected in the trunk by a flash detector (not shown) which enables lead FDA to gate 532 thereby setting flip-flop A. It should be noted in this regard that flip-flop A will be reset and flip-flop B will set as a result of the original seizing of the trunk and connection thereto through the OSLN and DPA to an incoming register at the time the call is originally established as explained earlier. Flip-flop A will now be set and flip-flop B will remain set while the sleeve lead SL from the OSLN is high. Thus, gate 510 will be enabled causing the output of gate 516 to go high. Since the subscriber station has no transfer class of service available, the class of service flip-flop will cause lead 503 to be high and lead 501 to be at ground thereby enabling NAND gate 502 to initiate the generation of a QRFS or GRFS request, as described above.

In the case of a transfer operation where subscriber station having a transfer class of service available has been connected to the outside world as a result of a direct inward dialed call, the flip-flops A and B will be reset and set, respectively, as described above. In this case, a flash of the hookswitch by the subscriber will be detected in the trunk and lead FDA will be enabled thereby setting flip-flop A via gate 532, so that flip-flops A and B will both be set. However, at this time, with gate 510 enabled providing a high at the output of gate 516, the class of service flip-flop will indicate that a transfer class of service is available to the subscriber by placing a high on lead 501 and ground on lead 503. Thus, as soon as the trunk is scanned via lead RTSD, the output of gate 508 will enable NAND gate 504, which will extend the XRFS signal on the service request bus to the trunk scanner. If in fact the subscriber did not desire to transfer to another subscriber station but merely desired connection to the operator, the flashing of the hookswitch will be still detected as a request for a transfer circuit and a XRFS service request signal will be generated and forwarded to the trunk scanner 89. The subscriber station will then be connected through the OSLN and an available transfer circuit to an incoming register.

To obtain connection to the operator, the subscriber then merely dials 0, which is detected by the number and code translator 46 as a request for connection to the operator on a transfer operation. The number and code translator 46 then enables the PBX-ESC interface via line 45 to enable the DOX lead indicating to the trunk that 0 has been dialed in connection with a transfer call. The enabled DOX lead will enable gate 532 and will also reset the class of service flip-flop so that lead 503 will go high and lead 501 will go to ground. At the time the trunk was connected through the OSLN to the transfer circuit, the ground on the sleeve lead from the OSLN caused flip-flops A and B to be reset and set, respectively, so that the enabling of gate 532 will once again set flip-flop A permitting the enabling of gates 510 and 502. A QRFS or GRFS signal will now be generated and extended to the trunk scanner 89.

In the case where the trunk has been acquired initially by a subscriber station on a call to the outside world, the flip-flops A and B will be placed in an advanced counter by a setting of flip-flop B upon receipt of a permanent ground on lead COMR from the central office trunk. Thus, in each case where the trunk has been seized, either from a subscriber station or the outside world, and forms part of a communication connection, the flip-flops A and B will remain in the advanced counter slot awaiting further requests for service, such as transfer requests and requests for connection to an operator. Since an attendant trunk merely generates a request for operator or a request for a transfer circuit, being incapable of effecting connections including the outside world, the logic circuitry required for such a trunk will obviously be less complicated than that required for an incoming/outgoing trunk, as disclosed and illustrated in connection with FIG. 9; however, the basic circuitry involved in the two types of trunks will be similar. The same is true of access trunks, which merely provides for connection of an operator to a subscriber station within the system or a station outside the system. The seizing of the access trunk is accomplished from the operator position circuit via bus ACD and the first available access trunk scanned by the trunk scanner will then be seized and both an XRFS and a GRFS signal will be forwarded to the trunk scanner simultaneously indicating that the request is from an access trunk.

What is claimed is:

1. A service circuit complex for use in a private automatic branch exchange having an operator service link network and a plurality of various type trunks for different type calls comprising:

groups of various type service circuits for servicing the different type each group containing only the same type of service circuit and having means for selecting one available service circuit at a time within the group and common control means for connecting a service circuit to a trunk through the operator service link network in response to a request for that type of service circuit from one of the trunks, said common control means including a trunk scanner for sequentially scanning the various trunks for service requests and responding to a service request by stopping and applying a request signal to the service circuit groups containing the requested service circuit type and a system timer for sequentially enabling said service circuit groups in an arrangement whereby a connection between a trunk and a selected service circuit can only be made while the group containing the service circuit is enabled and a request signal is applied thereto.

2. The service circuit complex of claim 1 wherein service requests from the trunks for different type service circuits are applied to said trunk scanner on different leads.

3. The service circuit complex of claim 2 wherein said selecting means is an individual rotary associated with each service circuit group for preselecting an available service circuit within the group to await connection to a trunk when a request signal is received and the service circuit group is enabled.

4. The service circuit complex of claim 3 wherein said trunk scanner includes monitor means for monitoring said rotaries to determine if at least one of each type of service circuit is available and means responsive to receipt of a service request coincident with an indication from said monitor means of an available service circuit of the type requested for stopping said trunk scanner at the trunk generating the request.

5. The service circuit complex of claim 2 wherein said sequential enabling consists of individual enabling time slots within a repetitive time sequence whereby each service circuit group is enabled during a different enabling time slot and the generation of a request signal is synchronized to the beginning of the enabling time slots.

6. The service circuit complex of claim 2 wherein said service circuit groups include at least one group of dial pulse acceptors, one group of transfer circuits and one group of loop circuits the latter being associated with an individual position circuit and the trunks include at least one trunk interfacing the branch exchange with other exchanges for connection to any one of said service circuits, at least one attendant trunk for connecting a local station within the branch exchange to an operator via said position circuit and one of said loop circuits and at least one access trunk for connecting said position circuit via one of said looop circuits to a local station within the exchange.

7. The service circuit complex of claim 6 wherein said interfacing trunk means applies to said trunk scanner a first service request for a dial pulse acceptor immediately upon sequence of the trunk by another exchange which is gated with the next enabling time slot after receipt of said first service request to inhibit the generation of request signals for transfer and loop circuits by said trunk scanner until the service request for a dial pulse acceptor is satisfied,.

8. The service circuit complex of claim 7 wherein said interfacing trunk means applies to said trunk scanner a second service request when next scanned by said trunk scanner after the generation of said first service request, said second service request causing said trunk scanner to stop upon indication of an available dial pulse acceptor.

9. The service circuit complex of claim 8 wherein said system timer generates one sequence of enabling time slots for said transfer and loop circuit groups and a second sequence of enabling time slots coincident therewith for said dial pulse acceptor groups and wherein said first service request inhibits the generation of the first mentioned enabling time slots until after the service request for a dial pulse acceptor is satisfied.

10. The service circuit complex of claim 6 including a queue circuit for receiving and servicing loop circuit requests in the order in which they are received from said interfacing and attendant trunks by applying a loop circuit request signal to said trunk scanner when the trunk being scanned is the same as the next trunk slated for servicing in said queue circuit.

11. The service circuit complex of claim 3 wherein each of said rotaries comprises a ring counter having a different output lead connected to each service circuit within its associated group to which an enabling signal is sequentially applied and a monitor circuit connected to said leads and to said service circuits for receiving signals indicating the availability of each service circuit so that when the enabling signal is applied to the lead of an available service circuit it is fed back by said monitor circuit to said ring counter to stop the operation thereof.

12. A trunk service circuit complex for use in a private automatic branch exchange comprising:

groups of various type service circuits, each group containing only the same type of service circuits;

a plurality of trunks;

a switching network for connecting any one of said trunks to one of said service circuits;

means in each of said trunks for generating service requests indicative of the type of service circuit to which connection is to be made;

means for scanning said trunks, said means being stopped at a trunk by a service request for marking the trunk and applying a corresponding request signal to all of the groups having the requested type of service circuit;

timing means for sequentially enabling said service circuit groups in an arrangement whereby a service circuit is marked for connection to a trunk only when its group is enabled and a request signal is applied thereto;

individual means associated with each group for selecting an individual available service circuit therein for marking, and path finding means responsive to the marking of one of said trunks and one of said service circuits for effecting a connection therebetween via said switching network.

13. The trunk service circuit complex of claim 14 wherein said service circuit groups include at least one group of dial pulse acceptors, one group of transfer circuits and one group of loop circuits the latter being associated with an individual position circuit and the trunks include at least one trunk interfacing the branch exchange with other exchanges for connection to any one of said service circuits, at least one attendant trunk for connecting a local station within the branch exchange to an operator via said position circuit and one of said loop circuits and at least one access trunk for connecting said position circuit via one of said loop circuits to a local station within the exchange.

14. The trunk service circuit complex of claim 13 wherein said selecting means is an individual rotary associated with each service circuit group for preselecting an available service circuit within the group to await connection to a trunk when a request signal is received and the service circuit group is enabled.

* * * * *